US009090186B2

(12) United States Patent
Wiegelmann

(10) Patent No.: US 9,090,186 B2
(45) Date of Patent: Jul. 28, 2015

(54) VEHICLE SEAT FOR A MOTOR VEHICLE

(71) Applicant: GM GLOBAL TECHNOLOGY OPERATIONS LLC, Detroit, MI (US)

(72) Inventor: Joerg Wiegelmann, Bodenheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 120 days.

(21) Appl. No.: 13/659,581

(22) Filed: Oct. 24, 2012

(65) Prior Publication Data

US 2013/0119742 A1 May 16, 2013

(30) Foreign Application Priority Data

Oct. 27, 2011 (DE) .......................... 10 2011 117 038

(51) Int. Cl.
| A47C 7/30 | (2006.01) |
| A47C 7/35 | (2006.01) |
| A47C 31/06 | (2006.01) |
| B60N 2/54 | (2006.01) |
| B60N 2/70 | (2006.01) |
| B60N 2/72 | (2006.01) |

(52) U.S. Cl.
CPC ... *B60N 2/54* (2013.01); *A47C 7/30* (2013.01); *A47C 7/35* (2013.01); *A47C 31/06* (2013.01); *B60N 2/7094* (2013.01); *B60N 2/72* (2013.01)

(58) Field of Classification Search
CPC .............. A47C 7/28; A47C 7/30; A47C 7/35; A47C 31/04; A47C 31/06; B60N 2/7094; B60N 2/72
USPC ........ 297/452.49, 452.52; 267/110, 144, 164, 267/165
See application file for complete search history.

(56) References Cited

U.S. PATENT DOCUMENTS

| 2,177,363 | A | * | 10/1939 | Flint ........................... 297/300.5 |
| 2,875,819 | A | * | 3/1959 | Hoag ................. 5/408 |
| 4,431,229 | A | | 2/1984 | Unger |
| 4,682,763 | A | * | 7/1987 | Kazaoka et al. ................ 267/89 |
| 6,109,693 | A | | 8/2000 | Bauer et al. |
| 6,412,874 | B1 | * | 7/2002 | Mayer ...................... 297/452.52 |
| 6,793,289 | B2 | * | 9/2004 | Kuster et al. ............. 297/452.52 |
| 7,036,864 | B2 | * | 5/2006 | Rehfuss et al. ................ 296/63 |
| 7,137,669 | B2 | * | 11/2006 | Nagayama ............... 297/452.49 |

(Continued)

FOREIGN PATENT DOCUMENTS

| DE | 202006001868 U1 | 4/2006 |
| DE | 102006032038 A1 | 1/2008 |

(Continued)

*Primary Examiner* — Ryan Kwiecinski
(74) *Attorney, Agent, or Firm* — Ingrassia Fisher & Lorenz PC

(57) ABSTRACT

A vehicle seat for a motor vehicle is provided. The vehicle seat includes a seat frame with a front seat shell and a rear cross member. Zigzag springs are arranged between the front seat shell and the rear cross member. Adjacently arranged first zigzag springs form a first spring arrangement and adjacently arranged second zigzag springs form a second spring arrangement, in which the zigzag springs comprise transversely running bearing legs on the end side for inserting the respective bearing leg into the front seat shell in a direction transverse to the seat frame. The bearing legs of the zigzag springs of the first spring arrangement can be inserted into the seat shell in a first direction and the bearing legs of the zigzag springs of the second spring arrangement can be inserted into the seat shell in a second direction that is opposite to the first direction.

14 Claims, 8 Drawing Sheets

(56) References Cited

U.S. PATENT DOCUMENTS

| | | | |
|---|---|---|---|
| 7,422,291 B2* | 9/2008 | Nagayama | 297/452.52 |
| 7,677,664 B2* | 3/2010 | Beneker et al. | 297/344.11 |
| 8,316,982 B2* | 11/2012 | Endo et al. | 180/273 |
| 2002/0117885 A1* | 8/2002 | Barile et al. | 297/452.52 |
| 2004/0004386 A1* | 1/2004 | Guillot | 297/452.52 |
| 2006/0152063 A1* | 7/2006 | Nagayama | 297/452.49 |
| 2009/0152931 A1* | 6/2009 | Sahashi | 297/452.49 |
| 2010/0133732 A1* | 6/2010 | Yamaguchi et al. | 267/140.4 |
| 2011/0004371 A1* | 1/2011 | Bullard | 701/36 |
| 2011/0108330 A1* | 5/2011 | Endo et al. | 177/136 |
| 2011/0233980 A1* | 9/2011 | Hoshi | 297/354.1 |
| 2013/0127227 A1* | 5/2013 | Oleson | 297/452.49 |

FOREIGN PATENT DOCUMENTS

| | | |
|---|---|---|
| DE | 102006058703 A1 | 6/2008 |
| DE | 202008011499 U1 | 12/2008 |
| EP | 1593547 A1 * | 11/2005 |
| ES | 2296428 A1 | 4/2008 |
| FR | 2861659 A1 | 5/2005 |
| FR | 2861660 A1 | 5/2005 |
| GB | 2459477 A | 10/2009 |

* cited by examiner

VEHICLE SEAT FOR A MOTOR VEHICLE

CROSS-REFERENCE TO RELATED APPLICATION

This application claims priority to German Patent Application No. 10 2011 117 038.7, filed Oct. 27, 2011, which is incorporated herein by reference in its entirety.

TECHNICAL FIELD

The present disclosure relates to vehicle seat for a motor vehicle, in particular a vehicle seat for a passenger car. The seat frame of the vehicle seat comprises, as seen in driving direction, a front seat shell and a rear seat cross member, with zigzag springs arranged between the front seat shell and the rear seat cross member and mounted in these.

BACKGROUND

For comfort reasons, vehicle seats comprise zigzag springs, which are mounted in the seat frame between the seat shell and the seat cross member. A seat cushion for the vehicle occupant is placed onto the zigzag springs, the seat shell and the seat cross member. The respective zigzag spring as a rule comprises a plurality of U-shaped sections that merge into one another. In the region of the front end, which faces the seat frame, the zigzag springs are mounted inserted or hooked into the seat shell and hooked into the seat cross member.

When the zigzag springs are arranged independently of one another, there is the risk that upon uneven loading of the seat cushion and thus uneven force introduction into the zigzag springs, these are moved laterally away from one another, so that because of this the sitting comfort is substantially reduced. If in the region of the seat shell the zigzag springs are only hooked into protrusions which are bent out of the seat shell sheet metal part, there is the risk that these bent-out portions bend or break off, as a result of which no secure mounting of the zigzag springs in the seat shell is guaranteed. From DE 103 069 20 B3 a vehicle seat for a motor vehicle is known, which comprises various zigzag springs which are mounted in the front seat shell and the rear seat cross member of the seat frame. These zigzag springs are identically formed and identically oriented. The free ends of the respective zigzag springs thus face in the same direction. The non-symmetrical arrangement of the zigzag springs with respect to the seat frame results in that weight forces of the vehicle occupants are unevenly introduced into the zigzag springs via the seat cushion.

Accordingly, it is desirable to create a vehicle seat with a defined arrangement of zigzag springs. In addition, other objects, desirable features and characteristics will become apparent from the subsequent summary and detailed description, and the appended claims, taken in conjunction with the accompanying drawings and this background.

SUMMARY

According to various aspects of the present disclosure, provided is a vehicle seat whose zigzag springs can be easily mounted, while ensuring a defined arrangement of the zigzag springs under the effect of the weight forces of a vehicle occupant using the seat.

In one exemplary embodiment, adjacently arranged first zigzag springs form a first spring arrangement and adjacently arranged second zigzag springs form a second spring arrangement. The zigzag springs comprise transversely running bearing legs on the end side for inserting the respective bearing leg in transverse direction of the seat frame into the seat shell. Here, the zigzag springs of the respective seat arrangement are connected spaced from their mountings on the end side by means of first spacer elements. The bearing legs of the zigzag springs of the first spring arrangement can be inserted in a first direction into the seat shell and the bearing legs of the zigzag springs of the second spring arrangement can be inserted into the seat shell in a second direction that is opposite to the first direction. The two spring arrangements are connected by means of two spacer elements that are variable in length in transverse direction of the seat frame.

Through this design, the two spring arrangements can be inserted into the seat shell in the same direction, namely in transverse direction of the seat frame. This is made possible in that initially the one spring arrangement is inserted into the seat shell and then, by changing the length of the second spacer elements, the second spring arrangement is inserted into the seat shell. Because of this, a symmetrical arrangement of the zigzag springs can be created in the vehicle frame, thus a symmetrical force introduction through the weight forces of the vehicle occupant. This produces a high seat comfort.

Generally, the respective spring arrangement comprises two zigzag springs. Thus, the seat frame serves to receive four zigzag springs arranged next to one another. In one example, the zigzag springs of the respective spring arrangement are identically designed. This reduces the parts variety and additionally contributes to configuring the arrangement of the zigzag springs which are mounted in the seat frame symmetrical in a simple manner. In one example, the spring arrangements should be arranged symmetrically to a center longitudinal axis of the seat frame.

For structural and design reasons, it is considered to be advantageous when the free ends of the bearing legs of the zigzag springs of the first spring arrangement are directed to the side of the seat frame that is adjacent to this spring arrangement and the free ends of the bearing legs of the zigzag springs of the second spring arrangement are directed to the side of the seat frame that is adjacent to the spring arrangement. The respective spring arrangement which has to be mounted after the already mounted spring arrangement is mounted in that this spring arrangement is moved away from the already mounted spring arrangement through length variation of the spacer elements. During this, its bearing legs are inserted into the seat shell.

In order to ensure a highly loadable mounting of the zigzag springs in the seat shell it is considered advantageous when the seat shell in the region of each receptacle for the bearing leg of the associated zigzag spring comprises a stamping with two holes aligned in transverse direction of the seat frame, wherein the bearing leg is inserted into the holes. Through this design of the seat shell for receiving the bearing leg of the associated zigzag springs, substantially higher forces can be introduced into the seat shell via the zigzag springs than would be the case if the seat shell would comprise bent-out straps, behind which the zigzag springs are hooked in. Here, there would be a risk that the straps may become damaged and the zigzag springs would no longer be held by these.

In order to ensure a secure connection of the respective zigzag spring in the region of the seat shell, the respective bearing leg should be mounted fixed in the seat shell in its leg direction. This fixing can be accomplished in different ways, for example in that the free end of the respective bearing leg is bent off and thus engages behind the one hole in the region of the stamping or in that the bearing leg is provided with one or two ring protrusions which position the bearing leg on one or both sides of the stamping with respect to the latter.

It can be advantageous when the respective first spacer element and/or the respective second spacer element comprises plastic, for example, a plastic injection molding, which is connected to the zigzag spring or the zigzag springs. It is generally easy, when the zigzag springs of the respective spring arrangement are arranged in the desired position to one another and then through injection molding, the first spacer elements are produced which during the injection process encase the zigzag springs of this spring arrangement.

The respective first spacer element is configured in one example so that it is invariable in its length. At the most, it can be slightly bent because of its advantageous formation from plastic.

Generally, respective adjacent zigzag springs of the same spring arrangement are connected to one another by means of three first spacer elements and/or the spring arrangements are connected to one another by means of three second spacer elements.

Varying the position of the two spring arrangements in transverse direction of the respective seat frame can be accomplished in different ways. In one example, the respective second spacer element can be varied from a position that is shortened in its longitudinal direction into a position that is lengthened in its longitudinal direction, wherein, with bearing legs of the one spring arrangement inserted into the seat shell and shortened position of the second spacer elements, the bearing legs of the other spring arrangement are out of engagement with respect to the seat shell. With bearing legs of the one spring arrangement inserted into the seat shell and extended position of the second spacer elements, the bearing legs of the other spring arrangement are located in engagement with respect to the seat shell.

In principle, this kinematic requirement is accomplished for example in that the second spacer element comprises two plates that are connected to each other, which are displaceable relative to each other. It is provided, in one example, that the plates engage with shortened plate arrangement and/or with extended plate arrangement. Because of this, the plates can be fixed relative to each other in their end positions. Alternatively it is provided for example that the second spacer element comprises two portions that are pivotably connected to each other. In one example, it is provided that the two portions in shortened position of the spacer element are directed upwards and in extended position form a plane. This positioning of the portions has the advantage that the portions, when the spring arrangement is inserted into the seat shell and the seat cushion rests on the zigzag springs, the seat cushion prevents the portions of the second spacer elements from pivoting upwards and thus changing the position of the two spring arrangements.

The respective zigzag spring is configured in one example so that it comprises a plurality of U-shaped portions merging into one another, for example, three U-shaped portions merging into one another. The bearing legs of the zigzag springs, which are inserted into the seat shell, are generally arranged perpendicularly to the bearing legs, which are located in the region of the ends of the zigzag springs, which are hooked into the seat cross member. This takes into account the differently oriented arrangement of the mountings of the zigzag springs in the seat shell on the one hand and in the seat cross member on the other hand.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE FIGURES

The various embodiments will hereinafter be described in conjunction with the following drawing figures, wherein like numerals denote like elements, and wherein.

DETAILED DESCRIPTION

Figure 1:
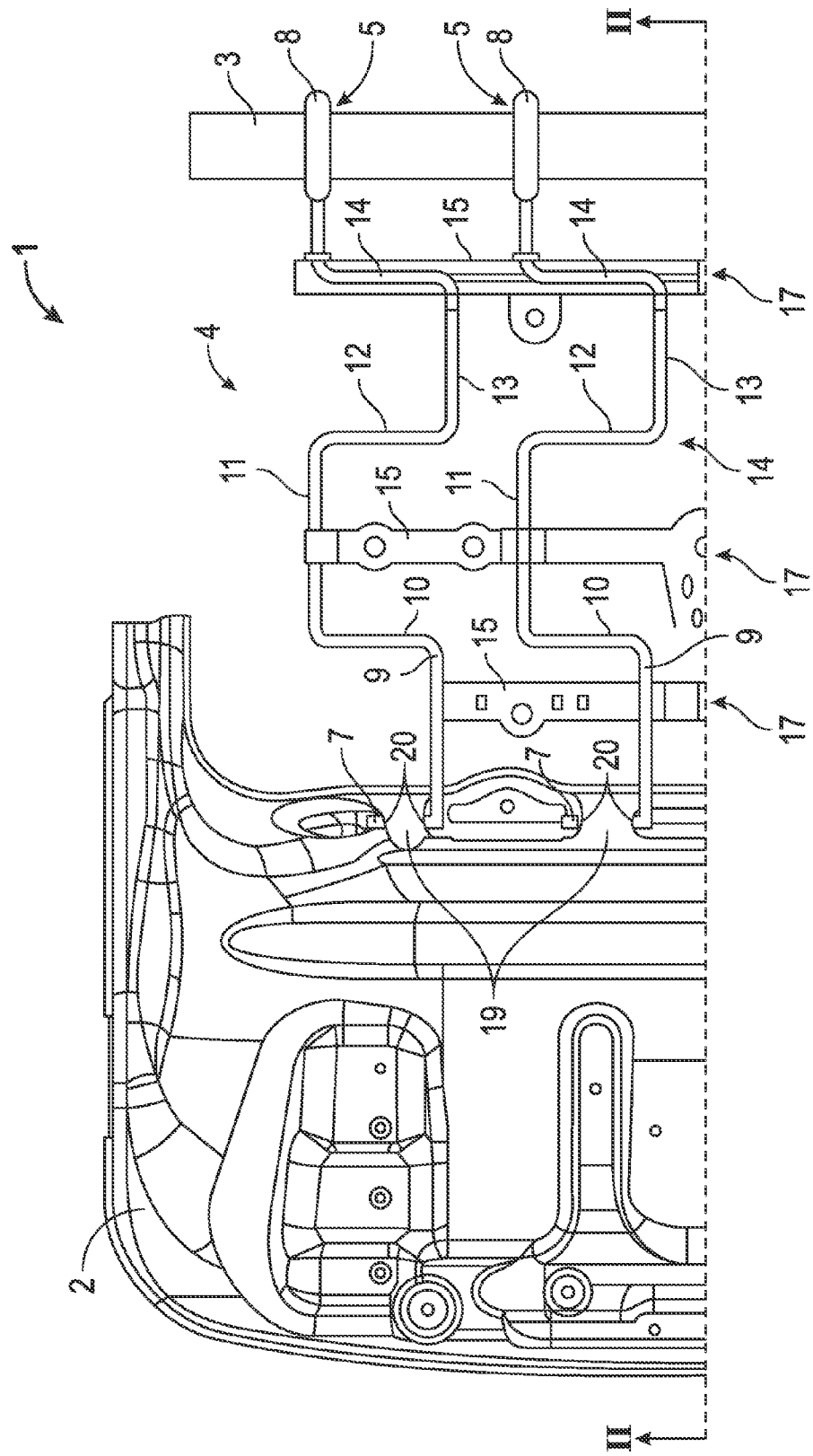
FIG. 1 relates to the vehicle seat according to one exemplary embodiment of the present disclosure, and illustrates the vehicle frame in a top view with zigzag springs mounted in said vehicle frame in addition to spacer elements assigned to these, illustrated for the right half of a symmetrically shaped seat frame.
Figure 2:
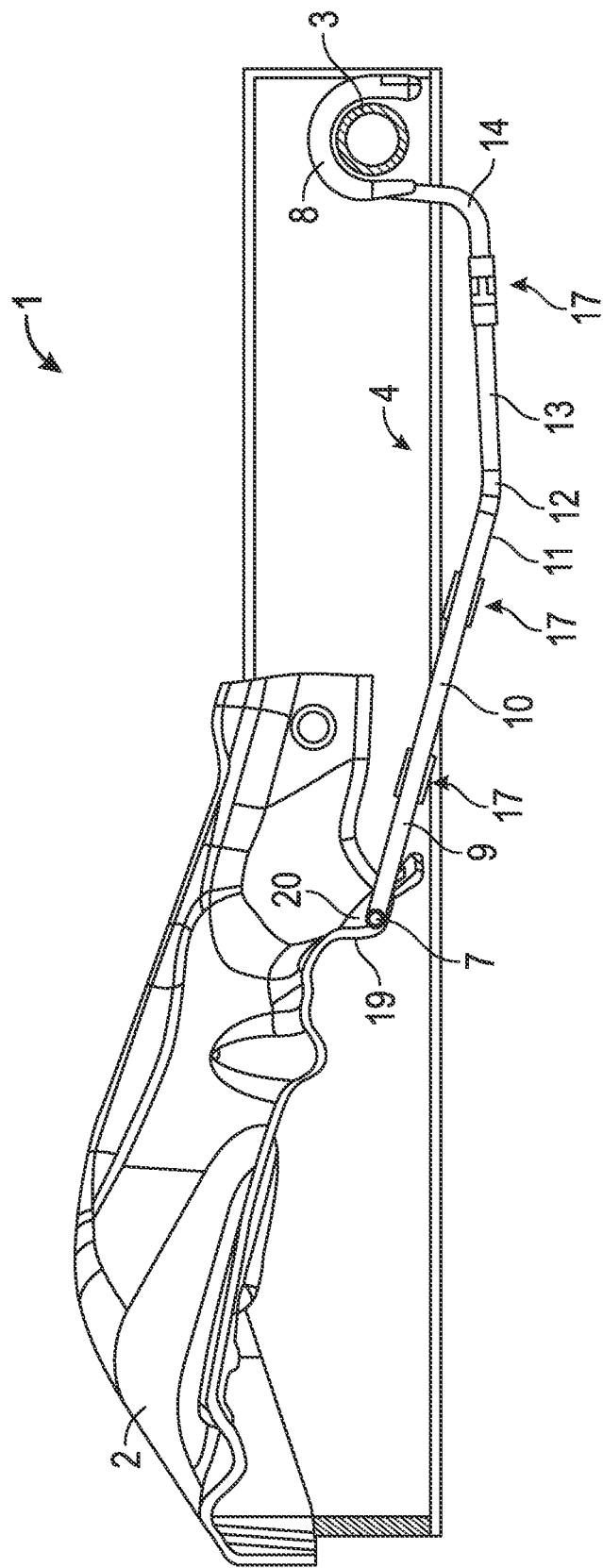
FIG. 2 is a section according to the line II-II in FIG. 1.

The following detailed description is merely exemplary in nature and is not intended to limit the present disclosure or the application and uses of the present disclosure. Furthermore, there is no intention to be bound by any theory presented in the preceding background or the following detailed description.

The vehicle seat according to an exemplary embodiment of the present disclosure, which is generally employed for a passenger car, is only illustrated with respect to the details in the drawing that are relevant to the present disclosure. Insofar, reference is initially made to the representation of FIGS. 1 to 6:

That region of the vehicle seat which serves for accommodating the vehicle occupant in the region of the occupant's thighs comprises a seat frame 1 with, seen in driving direction, a front seat shell 2 and a rear seat cross member 3. The seat shell 2 is designed as shaped sheet metal part and the seat cross member 3 as tube. Between the seat shell 2 and the seat cross member 3, four zigzag springs 4 are arranged and mounted in these. Adjacently arranged first zigzag springs 4, thus two zigzag springs 4, form a first spring arrangement 5 and adjacently arranged, second zigzag springs, thus the two further zigzag springs 4, form a second spring arrangement 6. Each zigzag spring 4 comprises a transversely running bearing leg 7 on the end side for inserting the respective bearing leg 7 in a direction transverse to the seat frame 1 into the seat shell 2. In the region of the end facing away from the bearing leg 7, the respective zigzag spring 4 comprises an approximately semi-circularly bent loop for hooking into the seat cross member from above.

Each zigzag spring 4 comprises three U-shaped portions merging into one another. A first U-shaped portion is formed through the bearing leg 7 and spring portions 9 and 10. The second U-shaped portion is formed through the spring portions 10, 11 and 12. The third U-shaped portion is formed through the spring portions 12, 13 and 14. The spring portion 14 is followed by a portion with the frame 8. The spring portions 9, 11 and 13 as well as the loop 8 are arranged parallel to one another, in addition, the bearing leg 7 and the spring portions 10, 12 and 14 are arranged parallel to one another.

The zigzag springs 4 of the respective spring arrangement 5 and 6 are connected spaced from their mountings on the end side by means of first spacer elements 15. Specifically, the spacer element 15, which is connected to the zigzag springs 4 adjacent to the bearing legs 7 of the respective spring arrangement 5 and 6, is part of a plastic component that not only interconnects the two zigzag springs 4, but also encases the spring portion 9 of the respective zigzag spring 4 in the direction of the bearing leg 7 and the respective bearing leg 7. The equivalent lies to the region of the zigzag spring 4 facing the loop 8. There, a further plastic component encases the spring portions 14 of the two zigzag springs 4 of the spring arrangement 5 and 6, where it connects the two zigzag springs 4 for creating the spacer element 15 in this region of the respective spring arrangement 5 and 6. In the region of the legs 11 of the zigzag springs 4 of the respective spring arrangement 5 and 6, the spacer element 15 surrounds the zigzag springs 4.

With the respective spring arrangement 5 and 6 formed through two springs 4, the two zigzag springs 4 are identically arranged. Here, with the spring arrangement 5, the free ends of the bearing legs 7 based on the driving direction are directed to the right while with the spring arrangement 6 the free ends of the bearing legs 7 are directed to the left. Otherwise, the free ends of the bearing legs 7 lead into short angled-off portions 16 arranged at a right angle to these. Thus, the zigzag springs 4 of the respective spring arrangement 5 and 6 are designed identically, but not the zigzag springs 4 of different spring arrangements 5 and 6. These are rather designed in mirror image corresponding to the axis of symmetry according to the line II-II in FIG. 1.

This requires that for mounting the zigzag springs 4 to the front seat shell 2 the zigzag springs 4 of the second spring arrangement 6 are mounted in the direction of the arrow X, the zigzag springs 4 of the first spring arrangement 5 in the direction of the arrow Y.

The bearing legs 7 of the zigzag springs 4 of the first spring arrangement 5 are thus inserted into the seat shell 2 in direction Y and the bearing legs 7 of the zigzag springs 4 of the second spring arrangement 6 are inserted into the seat shell 2 in the second direction X that is opposite to the first direction Y.

The two spring arrangements 5 and 6 are connected by means of second spacer elements 17 that are variable in length in transverse direction of the seat frame 1. Specifically, three spacer elements 17 are provided, wherein the one front spacer element 17 acts on adjacent legs 9 of two zigzag springs 4 of the different spring arrangements 5 and 6 and a rear spacer element 17 correspondingly acts on these zigzag springs 4 in the region of their spring portions 14. In the middle, a further spacer element 17 is arranged, which acts on the spring portions 11 of these two zigzag springs 4. In detail, the front and middle spacer element 17 forms a part of a plastic component, which is connected to the middle spacer elements 15 and the front spacer elements 15, thus also comprising a web 18 extending in longitudinal direction of the seat frame 1.

Figure 3:
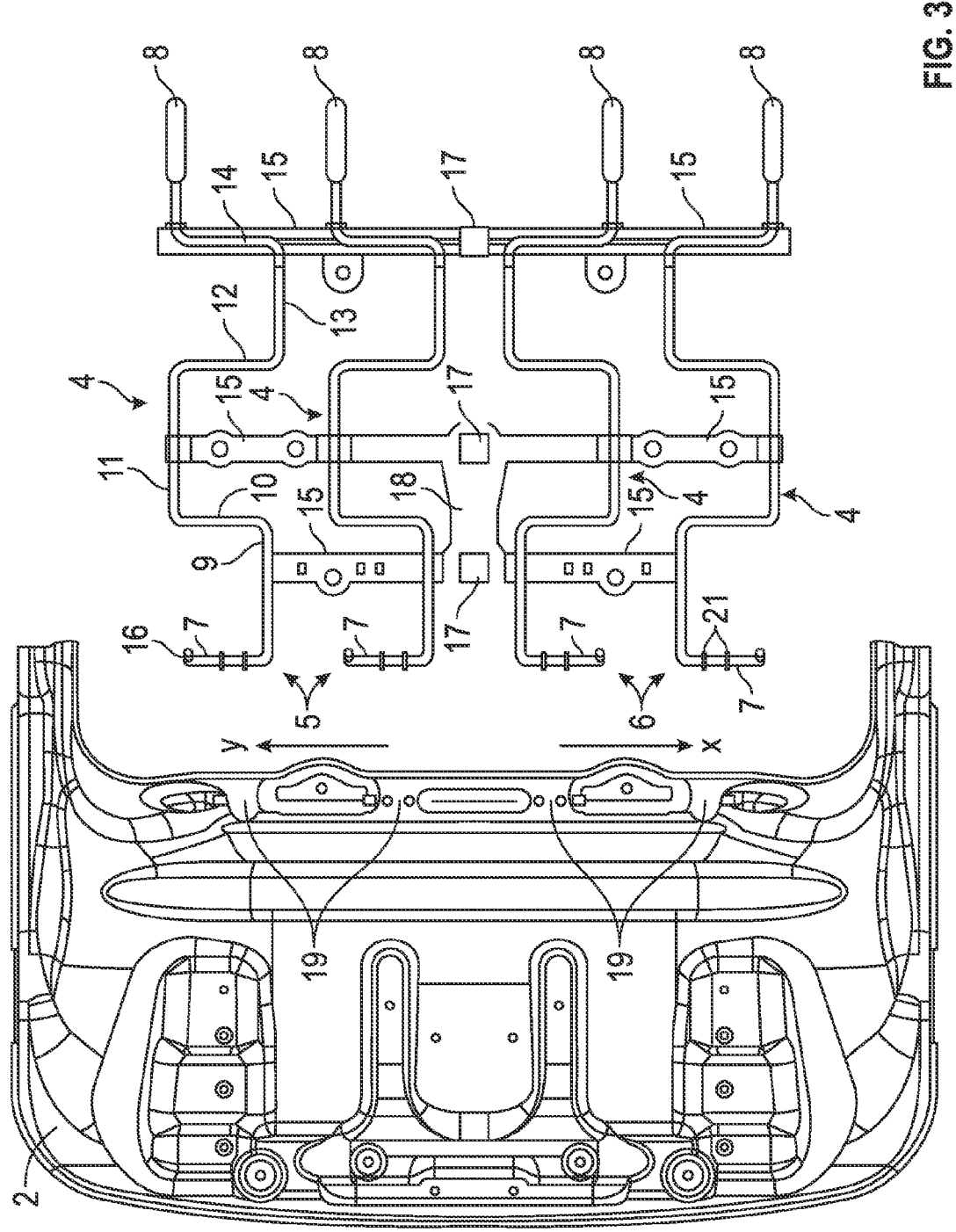
FIG. 3 is a top view of the arrangement of seat shell, zigzag springs and spacer elements, with the position of the second spacer elements shortened in length.
Figure 4:
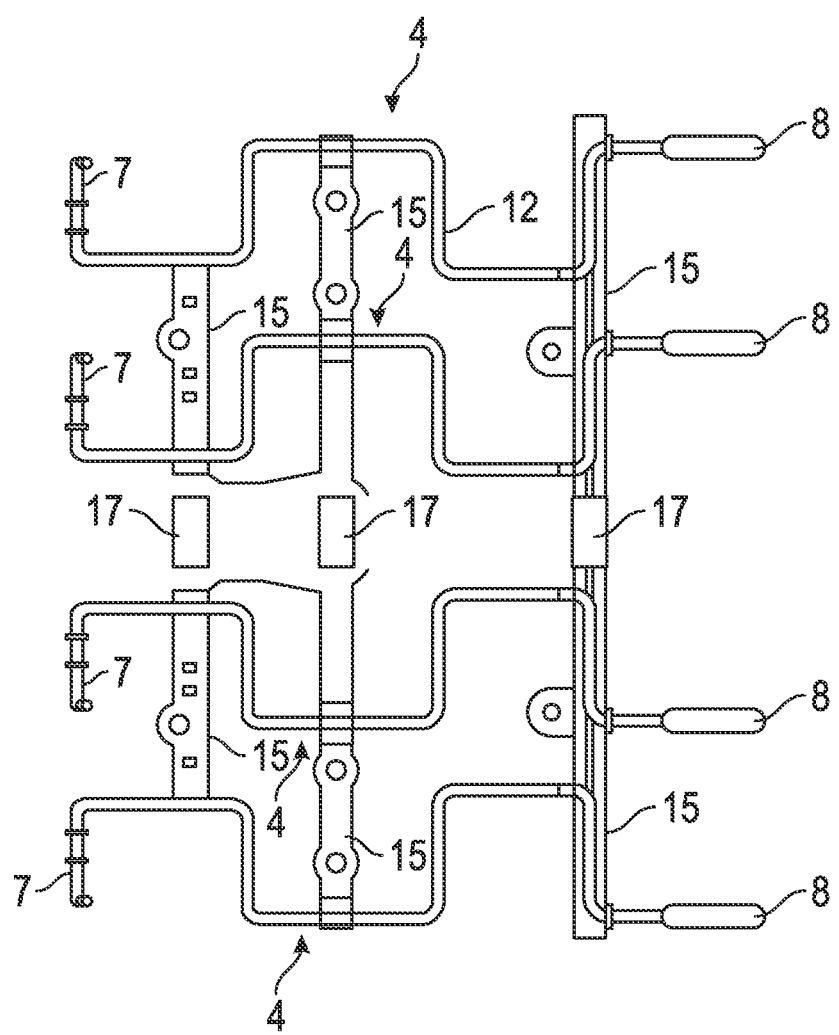
FIG. 4 illustrates the arrangement of zigzag springs and spacer elements, with the position of the second spacer elements extended in length.
Figure 5:
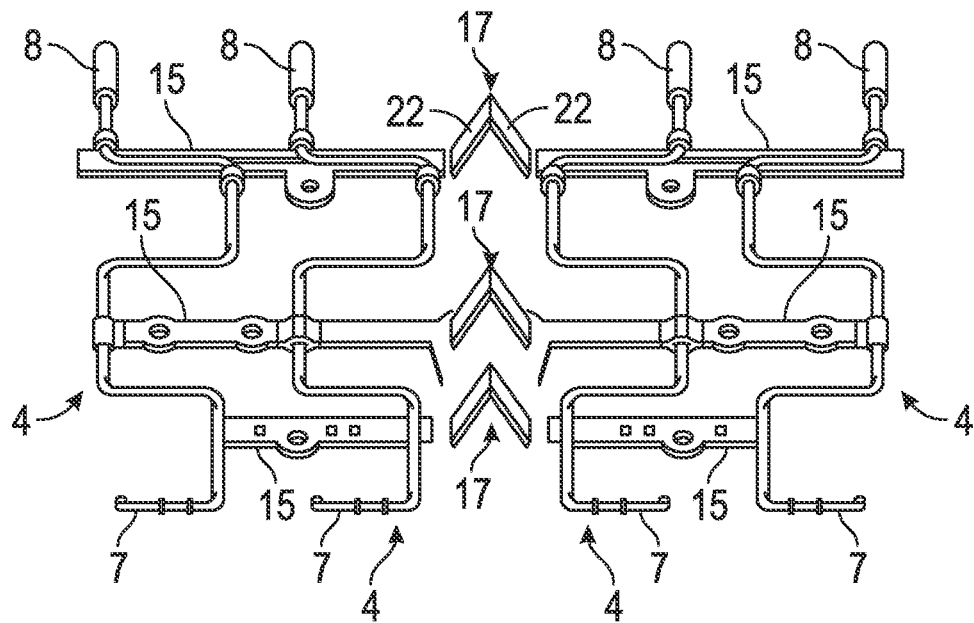
FIG. 5 illustrates the arrangement of zigzag springs and spacer elements according to FIG. 3, substantially seen from the front.
Figure 6:
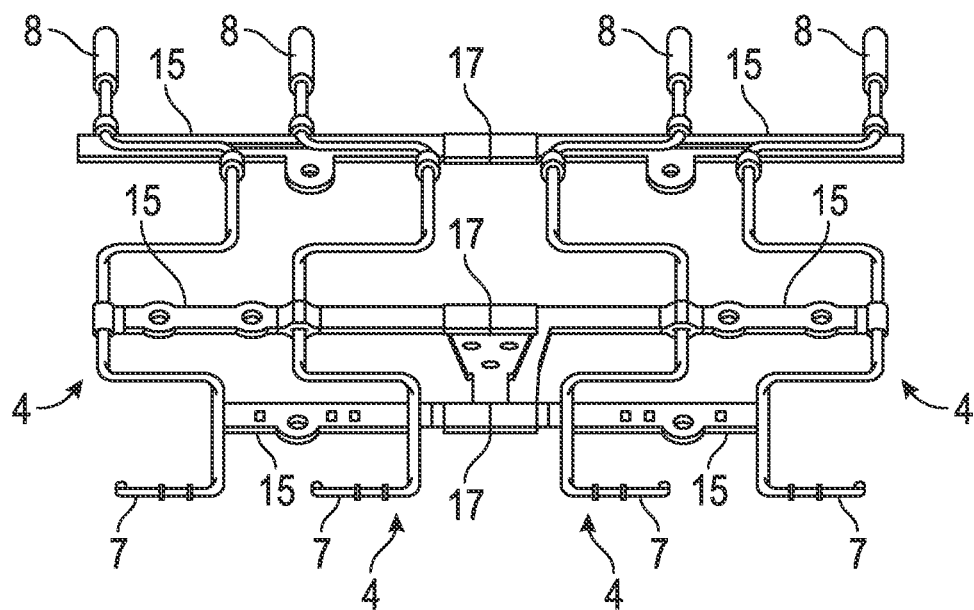
FIG. 6 is a view according to FIG. 5, for the state of the arrangement according to FIG. 4.

FIGS. 3 and 5 shows the spacer elements 17 in their shortened position, FIGS. 4 and 6 in their maximum-length position. Starting out from the shortened position according to FIGS. 3 and 5, the arrangement of the zigzag springs 4 can be mounted in the seat shell 2 in that initially the combination of these four zigzag springs 4 is slightly displaced to the right, so that the two bearing legs 7 of the spring arrangement 6 can be connected to the front seat shell 2. To this end, the latter comprises a stamping 19 with two holes 20 aligned in transverse direction of the seat frame 1 in the region of each mounting for the bearing leg 7. Into these holes 20 the bearing leg 7 is inserted. The cross section of the respective hole 20 is dimensioned so that both the bearing legs 7 as well as the short angled-off portion 16 fit through the hole 20. The angled-off portion 16 ensures that the bearing leg 7 under preload of the zigzag spring 4 cannot unintentionally free itself from the stamping 19 by moving against the insertion direction of the bearing leg 7. In addition, the respective bearing leg 7 is provided with circumferential beads 21, which axially position the bearing leg 7 within the stamping.

Inserting the two zigzag springs 4 of the spring arrangement 6 into the seat shell 2 is carried out with the arrangement of the zigzag springs 4 of the other spring arrangement 5 slightly angled off out of a plane. Once the spring arrangement 6 is connected to the seat shell 2, the two zigzag springs 4 of the spring arrangement 5, because of the shortened formation of the spacer elements 17, can now be inserted into the holes 20 of the associated stampings 19 of the seat shell 2. During this movement, the spacer elements 17 are transferred into their maximum length position. This state is illustrated in FIGS. 4 and 6. Here, the bearing legs 7 of the spring arrangement 5 are exactly inserted into the seat shell 2 as the bearing legs 7 of the spring arrangement 6, however in mirror image with respect to the axis II-II in FIG. 1.

The spacer elements 15 and 17 generally comprise plastic and are designed in one example as plastic injection molding.

The spacer elements 15 are invariable in their length, while the spacer elements 17 are variable in their length.

FIGS. 3 to 6 illustrate a fundamental function principle of the second spacer element 17. This comprises two portions 22 pivotably connected to each other. When the two portions 22 of the respective spacer element 17 form an acute angle, this spacer element 17 is in the shortened form. When the two portions 22 are in stretched arrangement, the spacer element 17 is in the long form. This is illustrated in FIGS. 4 and 6.

FIGS. 7 to 13 illustrate in greatly simplified representation the design and arrangement of second spacer elements 17, which are either, for the purpose of longitudinal change, are foldable according to the described configuration or longitudinally variable because of a relative displacement of plate portions.

Figure 7:
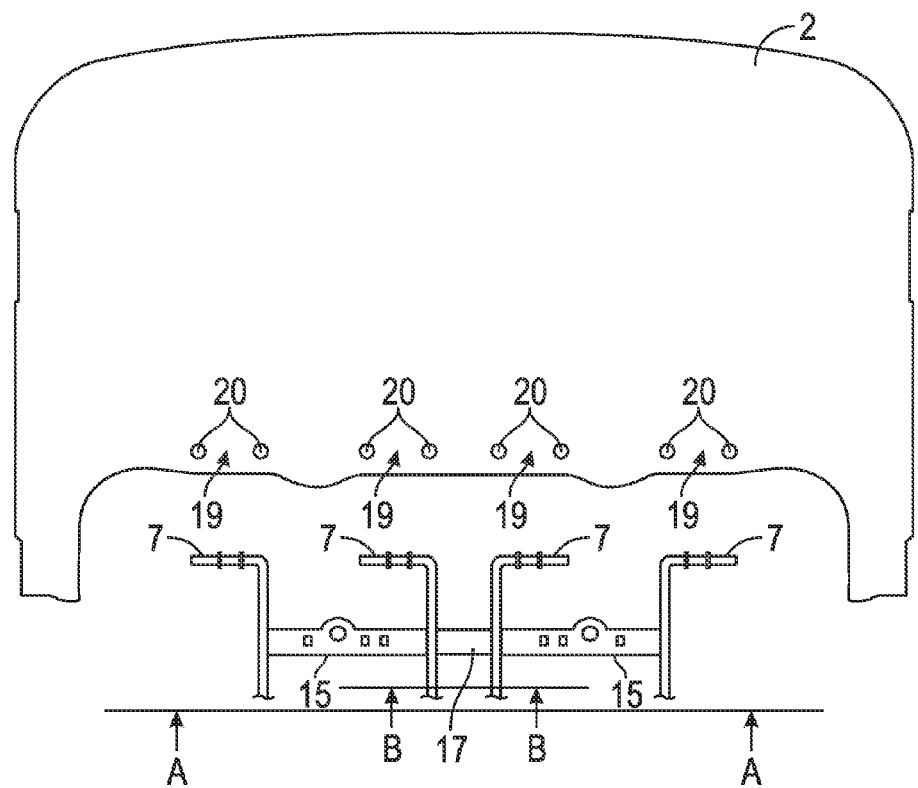
FIG. 7 is a top view of the arrangement of seat shell and ends of the zigzag springs prior to the mounting of the zigzag springs in a position of the zigzag springs with second spacer elements extended in the length.

FIG. 7 shows an arrangement of seat shell 2 and facing bearing legs 7 of the four zigzag springs prior to the mounting of the zigzag springs 4.

Figure 8:
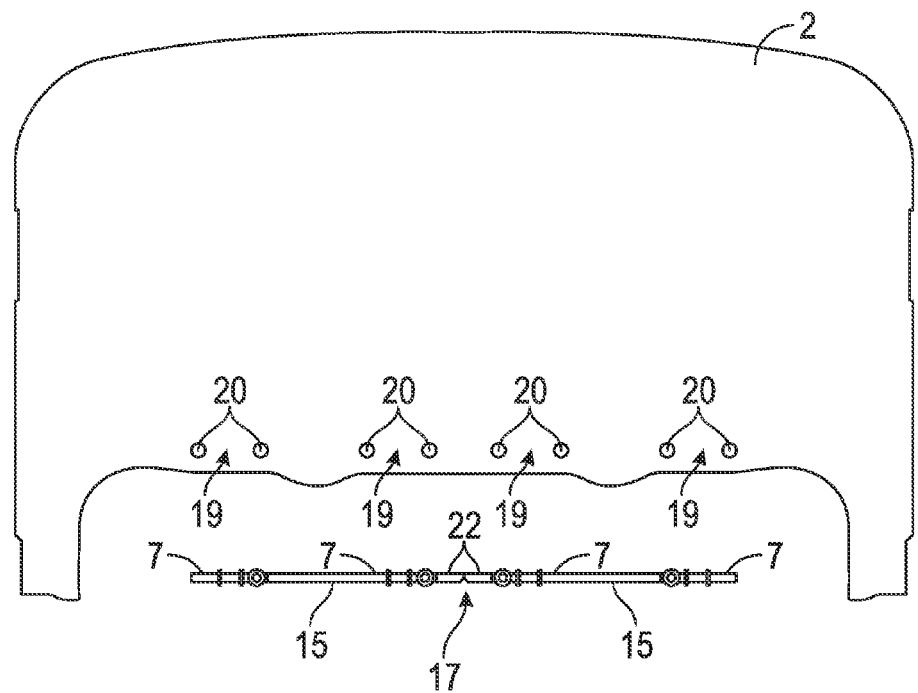
FIG. 8 is a top view of the arrangement of seat shell and bearing legs of the zigzag springs on the end side, illustrated before the mounting of the zigzag springs, when using second spacer elements, which comprise pivotably interconnected portions, shown for the long position of the one illustrated second spacer element.
Figure 9:
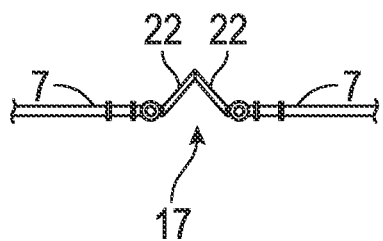
FIG. 9 is a detail representation relating to the second spacer element according to FIG. 8, illustrated for the short position of this spacer element.
Figure 12:
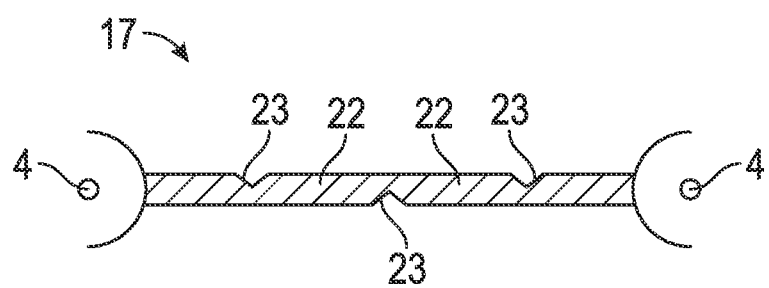
Figure 13:
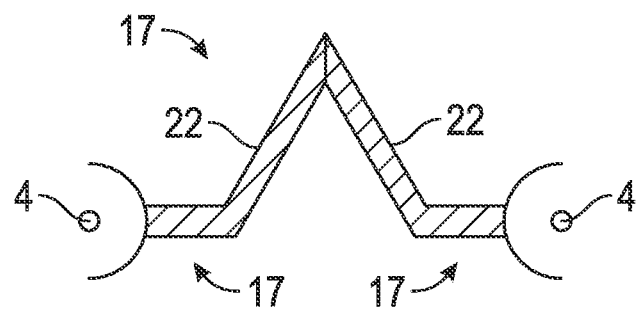

FIG. 8 illustrates the arrangement according to FIG. 7, however in a section according to the line A-A in FIG. 7. Here it is clearly noticeable that the portions 22 of the spacer element 17 are in the long, extended position. FIG. 9 illustrates these foldable portions 22 in their folded-up position, as well as the zigzag springs 4 adjacent to the spacer element 17 in the region of their bearing legs 7. With respect to the representation of the spacer element 17, the situation according to FIGS. 8 and 9 is represented enlarged in the FIGS. 12 and 13. These figures constitute sections according to the line B-B in FIG. 7. FIG. 12 shows that the portions 22 are created by forming notches 23 in the spacer element 17 comprising plastic.

Figure 10:
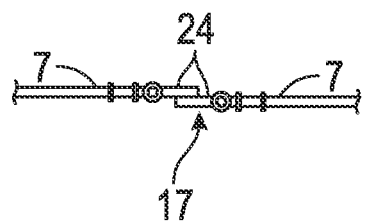
FIG. 10 illustrates the arrangement of two adjacent zigzag springs with a second spacer element connecting these, in a design of the spacer element having two plates that are displaceable relative to each other, illustrated for the long position of the second spacer element.
Figure 11:
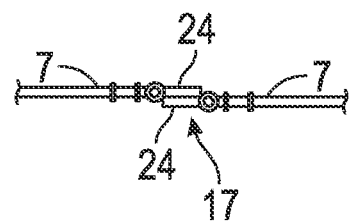
FIG. 11 illustrates the arrangement according to FIG. 10, illustrated for the short position of the second spacer element, FIGS. 12 and 13 provide detail representations of the second spacer element for the exemplary embodiment according to FIGS. 8 and 9, and FIGS. 14 to 17 provide detail representations of the second spacer element according to the exemplary embodiment of FIGS. 10 and 11.

FIGS. 10 and 11 show for the section routing according to the line A-A in FIG. 7, the modified configuration of the spacer element 17, which comprises two interconnected plates 24, which are displaceable relative to each other. Otherwise the representation of FIGS. 10 and 11, based on the arrangement of the spacer element 17 and the zigzag springs 4 connected with these, corresponds to the representation of FIGS. 8 and 9.

Figure 14:
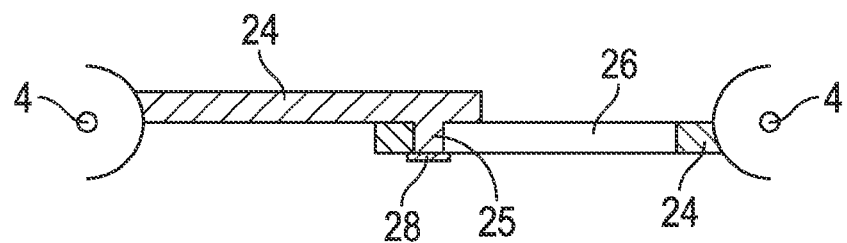
Figure 15:
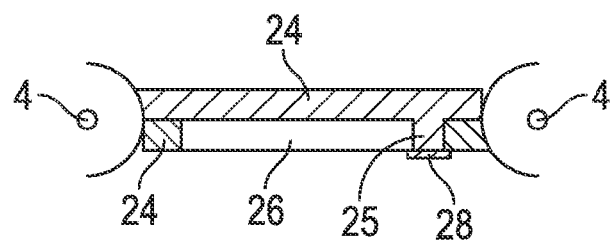
Figure 16:
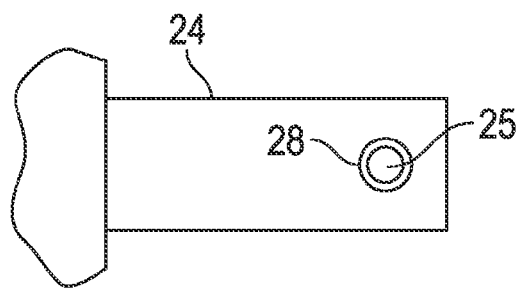
Figure 17:
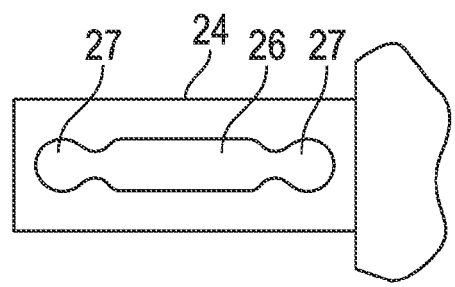

FIGS. 14 and 15 illustrate, with section routing according to the line B-B in FIG. 7, the arrangement of the plates 24 of the spacer element 17 and the zigzag springs 4 connected with these for the version of the spacer element 17 having the plates. FIG. 14 illustrates the long state of the spaced element 17, and FIG. 15 illustrates the short state of the spacer element 17. FIG. 16 shows a top view of the one plate 24, and FIG. 17 shows a top view of the other plate 24. It is evident, in one example, from the representation of FIG. 17 that a pin-shaped shoulder 24, which is connected to the one plate 24 and penetrates a longitudinal slit 26 of the other plate 24, can engage into bead ends 27 of this plate 24 comprising the slit 26.

In the region of its end facing away from the plate 24, the pin 25 is provided with a thickened portion 28, so that the two plates 24 cannot come apart.

Since with the design of the respective spacer element 17 with the plates 24 the displacement of the plates 24 relative to each other takes place in the plane, the engagements in the form of the bead ends 27 are advantageous, for example, in the long position of the spacer element 17. With the foldable design of the spacer elements 17 by contrast, wherein the portions 22 pivot upwards in the shortened position of the spacer element 17, no engagement is required since in the long position of the spacer element 17 their portions 22 form a plane and a seat cushion, which with mounted vehicle seat rests on the zigzag springs 4, the seat shell 2 and the seat cross member 3, prevents that the spacer elements 17 with their portions 22 are transferred into the shortened position pivoted upwards.

The bearing legs 7 of the zigzag springs 4 are arranged under generally perpendicular to the loops 8 of the zigzag springs 4, which are hooked into the seat cross member 3. As a general rule, hooking-in of the zigzag springs 4 into the seat cross member 3 is carried out after the zigzag springs 4 have been hooked into the seat shell 2 at the front in the sense described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A vehicle seat for a motor vehicle comprising:
    a seat frame with a front seat shell and a rear seat cross member; and
    a plurality of zigzag springs arranged between the front seat shell and the rear seat cross member, with a first adjacently arranged subplurality of the plurality of zigzag springs forming a first spring arrangement and a second adjacently arranged subplurality of the plurality of zigzag springs forming a second spring arrangement, each of the plurality of zigzag springs including transversely running bearing legs on an end side for inserting the respective bearing leg into the front seat shell in transverse direction of the seat frame, the bearing legs of the zigzag springs of the first spring arrangement insertable into the front seat shell in a first direction and the bearing legs of the zigzag springs of the second spring arrangement insertable into the front seat shell in a second direction that is opposite to the first direction,
    wherein the zigzag springs of the first spring arrangement and the zigzag springs of the second spring arrangement are connected so as to be spaced from their mountings on an inside of the front seat shell by means of first spacer elements, and the zigzag springs of the first spring arrangement and the zigzag springs of the second spring arrangement are connected by means of second spacer elements that are variable in length in a transverse direction of the seat frame,
    wherein the second spacer elements further comprise two interconnected plates which are displaceable relative to each other between a short plate arrangement and a long plate arrangement,
    wherein the second spacer elements further comprise two portions that are pivotably connected to each other, in which the two portions in the shortened position of the spacer element are directed upwards and in extended position form a plane.

2. The vehicle seat according to claim 1, wherein the first subplurality of zigzag springs and the second subplurality of zigzag springs are identical.

3. The vehicle seat according to claim 1, wherein the first spring arrangement and second spring arrangement are arranged symmetrically with respect to the center longitudinal axis of the seat frame.

4. The vehicle seat according to claim 1, wherein a free end of each of the bearing legs of the zigzag springs of the first spring arrangement are directed to the side of the seat frame that is adjacent to the first spring arrangement and a free end of each of the bearing legs of the zigzag springs of the second spring arrangement are directed to the side of the seat frame that is adjacent to the second spring arrangement.

5. The vehicle seat according to claim 1, wherein the front seat shell, in the region of a receptacle for each of the bearing legs of the respective one of the plurality of zigzag springs comprises a stamping in which two holes are aligned in a direction transverse to the seat frame and the respective bearing leg is inserted into the holes.

6. The vehicle seat according to claim 5, wherein the respective bearing leg in a respective leg direction of the bearing leg is mounted fixed in the front seat shell.

7. The vehicle seat according to claim 6, wherein the respective bearing leg is mounted fixed in the front seat shell by means of at least one of a bead and an inside angled-off portion.

8. The vehicle seat according to claim 1, wherein the first spacer elements and the second spacer elements further comprise a plastic injection molding that connects the respective one of the first spacer elements and second spacer elements to the respective zigzag springs of the first spring arrangement and second spring arrangement.

9. The vehicle seat according to claim 1, wherein the first spacer elements are invariable in length.

10. The vehicle seat according to claim 1, wherein adjacent zigzag springs of the first spring arrangement are interconnected by three first spacer elements.

11. The vehicle seat according to claim 1, wherein adjacent zigzag springs of the second spring arrangement are interconnected by three first spacer elements.

12. The vehicle seat according to claim 1, wherein each one of the second spacer elements is variable from a position shortened in its longitudinal direction into a position extended in its longitudinal direction, with respective bearing legs of the zigzag springs of the second spring arrangement inserted in the front seat shell, the respective second spacer elements are in the shortened position and the respective bearing legs of the zigzag springs of the first spring arrangement are out of engagement with the front seat shell, and with respective bearing legs of the zigzag springs of the second spring arrangement inserted in the front seat shell, the respective second spacer elements are in the extended position and the respective bearing legs of the zigzag springs of the first spring arrangement are in engagement with the front seat shell.

13. The vehicle seat according to claim 1, wherein each of the plurality of zigzag springs further comprises three U-shaped portions merging into one another.

14. The vehicle seat according to claim 1, wherein the bearing legs of each of the plurality of zigzag springs are arranged under and perpendicular to a second bearing leg of each of the zigzag springs, which are hooked into the seat frame.

* * * * *